UNITED STATES PATENT OFFICE.

HERMAN C. MEISTER, OF ST. LOUIS, MISSOURI.

PROCESS OF EXTRACTING ZINC FROM ZINC-SKIMMINGS.

SPECIFICATION forming part of Letters Patent No. 714,503, dated November 25, 1902.

Application filed August 16, 1902. Serial No. 119,836. (No specimens.)

*To all whom it may concern:*

Be it known that I, HERMAN C. MEISTER, a citizen of the United States, residing at St. Louis, in the State of Missouri, have invented a new and useful Improvement in Processes of Extracting Zinc from Zinc-Skimmings, of which the following is a specification.

My invention relates to a process of extracting zinc from the substance technically known as "zinc-skimmings," which is produced in large quantities in the process of galvanizing iron in its various forms. The substance is composed ordinarily of oxid of zinc, chlorid of zinc, oxychlorid of zinc, chlorid of ammonia, and miscellaneous foreign substances, all in varying proportions, and various processes of extracting the zinc have heretofore been employed to a considerable extent. All processes that have, so far as I am aware, been practiced heretofore, however, present difficulties and objections. The processes employed have been by no means satisfactory in the amount of zinc recovered, a considerable percentage being lost in the form of fumes or wash, according to the method of treatment. The fumes referred to consist of chlorid of ammonia and chlorid of zinc, both of which are noxious in a high degree and not only are a nuisance to the neighborhood, but are highly injurious to the comfort and health of the workmen. It is obvious that a loss of zinc must result wherever there is a volatilization in the form of chlorid of zinc, and the quantity of the chlorid of zinc is increased by the presence of the chlorid of ammonia.

The object of my invention is to recover the highest possible percentage of zinc from the zinc-skimmings in an economical manner on a commercial scale and without the production of the fumes of the chlorid of zinc or any other fumes of an injurious nature in any considerable quantity.

My process consists in converting substantially all the zinc present in the form of chlorid of zinc into carbonate of zinc, so that either after separation from the remaining substances or in association with them it may be further treated by the ordinary process of distillation for the recovery of the zinc. To this end I treat the zinc-skimmings with the carbonate of an alkali, preferably carbonate of soda, in the presence of moisture.

Confining my description to the employment of carbonate of soda, which is the most advantageous to use under all ordinary conditions, I preferably mix it preliminarily with the zinc-skimmings by grinding them together in the proportion of approximately one part of carbonate of soda to from two to five parts of the skimmings, depending upon the relative quantity of chlorids in the latter, which is a matter which can be readily determined by test or analysis, the general rule being that the larger the amount of chlorids present the greater the quantity of carbonate of soda to be used. This rule as to proportion applies also to the other carbonates of an alkali. However, it should be understood that an excess of the treating substance in no manner affects the process, but bears only upon the question of economy. In the more or less finely divided condition referred to the mixture of skimmings and carbonate of soda is thrown into a tank of water, whereupon the chemical reactions sought take place, and these are facilitated by heating or boiling the water, though heat beyond the heat of the chemical action itself is not absolutely essential. The material chemical reactions which take place are the following: The zinc of the chlorid of zinc and oxychlorid of zinc replaces the alkaline metal of the alkaline carbonate, forming carbonate of zinc, while the alkaline metal combines with the chlorin to form chlorid of the alkaline metal. With carbonate of soda as the treating substance chlorid of sodium is formed—

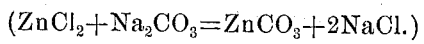

$$(ZnCl_2 + Na_2CO_3 = ZnCO_3 + 2NaCl.)$$

The resulting mass is carbonate of zinc in association with the chlorid of the base of the treating substance, and the latter may be removed, if desired, by drawing off the aqueous solution, the carbonate of zinc, being insoluble, remaining behind as a sediment. Minor chemical reactions also take place; for instance, where carbonate of soda is the treating substance, the production of ammonia and additional chlorid of sodium from the chlorid of ammonia present and the carbonate of soda, both of which are soluble in water, and which may be saved, if desired, from the aqueous solution which is drawn off. It is obvious that in order to permit the separation of the carbonate of zinc from the other substances in aqueous solution, the solution must necessarily be highly fluid. This however, is not essential to the process, since for the carrying out of the latter it is only necessary that there be sufficient water present to produce the required chemical reactions, and this may be effected by the use of a comparatively small quantity of water, if sufficient time is allowed. The mass in a plastic or even in a substantially dry condition or the carbonate of zinc alone, separated from the other substances, as above described, may be treated in association with carbon in a retort for the distillation and recovery of the zinc in the usual way.

It will be understood, of course, that the oxid of zinc originally in the zinc-skimmings remains unaffected, or substantially so, and in any separation that may be made by forming and drawing off an aqueous solution it is part of the sediment. Any free zinc that may occur in the skimmings in the form of shot metal or otherwise is recovered in the distillation.

What I claim as new, and desire to secure by Letters Patent, is—

1. The process of converting zinc compounds of zinc-skimmings into carbonate of zinc, which consists in treating the zinc-skimmings with the carbonate of an alkali in the presence of moisture, substantially as described.

2. The process of converting zinc compounds of zinc-skimmings into carbonate of zinc, which consists in treating the zinc-skimmings with carbonate of soda in the presence of moisture, substantially as described.

3. The process of converting zinc compounds of zinc-skimmings into carbonate of zinc, which consists in treating the zinc-skimmings with the carbonate of an alkali in the presence of moisture, and applying heat to the mixture, substantially as described.

4. The process of converting zinc compounds of zinc-skimmings into carbonate of zinc and separating the carbonate of zinc from the mass, which consists in treating the zinc-skimmings with the carbonate of an alkali with sufficient water to form an aqueous solution of the resulting soluble compounds, and thereafter drawing off the solution, leaving the insoluble carbonate of zinc as a sediment, substantially as described.

HERMAN C. MEISTER.

In presence of—
  OTTO F. MEISTER,
  RICHARD HOSPES.